United States Patent Office 3,634,561
Patented Jan. 11, 1972

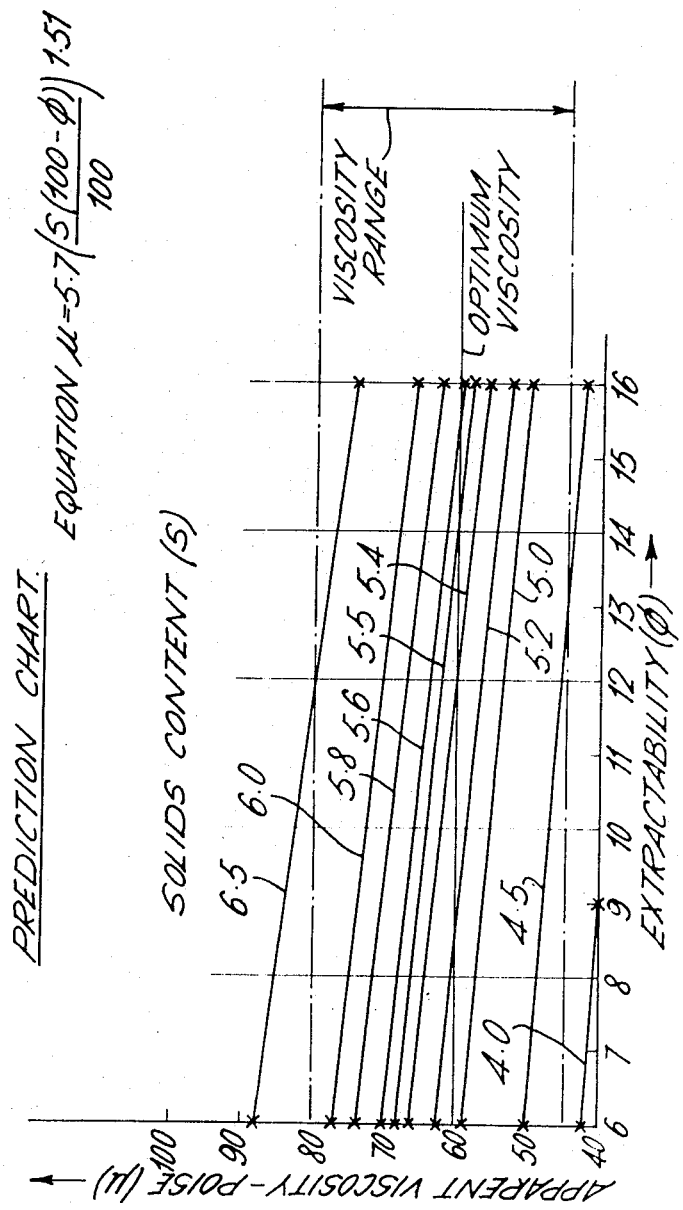

3,634,561
COLLAGEN PRODUCTS
Arthur Ernest Hawkins, Bedford, and Kenneth William Taylor, Higham Ferrers, England, assignors to Lever Brothers Company, New York, N.Y.
Filed Mar. 13, 1969, Ser. No. 806,923
Claims priority, application Great Britain, Mar. 18, 1968, 12,937/68
Int. Cl. A22c *13/00;* C08h *7/04;* D01f *9/04*
U.S. Cl. 264—40                 5 Claims

ABSTRACT OF THE DISCLOSURE

In the preparation of collagen dough the extractability, which is a measure of acid solubility, is determined by extraction with an acid, centrifugation, and determination of acid-soluble matter in the liquid portion. Extractability within a range of 8% to 16%, dry weight basis, a solids content within the range of 4.5% to 6.5% dry weight basis, and an apparent viscosity between 45 and 80 poises are characteristics which minimize variations in quality and provide a greater proportion of satisfactory casings for sausages or the like.

---

The invention relates to the preparation of collagen doughs, for use particularly in the preparation of artificial sausage casings. The dough may, however, be used for other purposes such as the preparation of films or filaments for surgical use.

Is casing manufacture the preparation of doughs that will consistently give a good casing is very difficult. It is desirable that the casings shall be neither tough, dull and liable to splitting, nor weak, over-glossy and liable to bubbling. The properties of the casing are determined by the properties of the dough and it has been difficult both to control the properties of the dough and the collagen from which it is made, and to select those properties that are significant, so that dough preparation has been very much an art and a consistent product difficult to obtain.

We have found that if the extractability of alkali-treated collagen, a measure of its acid-solubility, is determined, then a satisfactory dough can be obtained if the solids content of the collagen as prepared in milled form for conversion to swollen dough, is adjusted, in accordance with the determined value for the extractability, to result in a convenient apparent viscosity in the swollen dough, this viscosity being that found by experience to lead to the production of good casing or other products. The extractability of the collagen is itself adjusted during the preparation of the collagen by alkali treatment of raw material, which is most conveniently green hide.

According to the invention therefore there is provided a method for the preparation of an extrudable collagen dough in which:

(i) collagen is treated with a strong alkali in the presence of a salt capable of preventing swelling of the collagen,
(ii) the extractability, namely the proportion of a sample that is acid-soluble, is determined by any suitable method,
(iii) a swollen dough is made from the treated collagen, the solids content being adjusted in accordance with the determined extractability of the collagen to give an The extractability is a measure of the breakdown of the apparent viscosity convenient for extrusion.

natural insoluble collagen matrix to give soluble material, and is defined as the proportion of a given collagen sample that is acid-soluble, as determined by any suitable method. Such a method is of course conveniently solution in for example 0.15 M acetic acid, but any other method that directly or indirectly gives an indication of the proportion of the sample that is in fact acid-soluble can be used. The solubility has reference to single tropo-collagen molecules the fundamental building units of collagen; their M.W. is about 300,000.

Preferably when green mechanically unhaired hide collagen is used the extractability is in the range 8 to 16% on a dry weight basis and the solids content is in the range 4.5 to 6.5% on the same basis, the apparent viscosity of the dough accordingly being in the range 45 to 80 poise.

It is particularly preferred, for acid-swollen doughs of pH 2.9 to 3.1, made from mechanically unhaired green hide collagen, that the extractability ($\phi$), the solids content (S) and the apparent viscosity ($\mu$) at 920 sec.$^{-1}$ are in the following relation:

$$\mu = 5.7 \pm 1 \left[ \frac{s(100-\phi)}{100} \right] 1.5 \pm 0.2$$

In words, this relation is that the apparent viscosity at the given shear rate is proportional to the product of the solids content and the fraction of non-extractable collagen, raised to a power of $1.5 \pm 0.2$. The apparent viscosity is the viscosity of a Newtonian fluid (shear stress proportional to shear rate) showing the same resistance to flow as the dough at the given shear rate.

The extractability is conveniently determined on the batch concerned since treated collagen can readily be held in store and in practice is so held to give a manufacturing "float." However, if the raw material is uniform enough the extractability can be determined by reference to a record of the value for a similar earlier batch, similarly treated.

The extractability of collagen for the purposes of the numerical relations and preferences given herein the weight percentage of a 1.5 g. sample of milled collagen, pressed free of superficial moisture, taken up after 12 hours soaking at 20° C. in 100 ml. of water 0.15 M with acetic acid, and remaining in solution after centrifugation for ½ hour at 27,000 g. and filtration of the supernatant through a sintered filter of porosity No. 3. The amount of collagen in the supernatant may be determined by any convenient method, for example hydroxyproline analysis or the modified Biuret reaction, and is calculated as dry weight. The percentage is related to the weight of 1.5 g. of a sample, conveniently 5.0 g., identical to the original, remaining after drying to constant weight at 105° C. Fat and ash may be ignored in good collagen low in them if a preliminary determination has confirmed that they are low.

A suitable treatment for collagen to adjust the extractability is for example to soak it, in the form of pieces of hide split for example, in saturated or nearly saturated (preferably over 90%) sodium sulphate solution for a few hours, until it is uniformly impregnated, then to soak in a similar solution containing sodium hydroxide, preferably at a pH above 13, until the desired extractability is reached, the time required being found by simple experiment. The sodium sulphate prevents swelling of the collagen, which is not desired at this stage. Common salt is also effective as an anti-swelling agent. The time required is dependent on the conditions for example the temperature, the concentration of the sodium hydroxide and the state of comminution of the collagen. When for example sodium sulphate is being used and the temperature is 20° C. about 20 hours is sufficient in 1 N sodium hydroxide. Where sodium chloride is used as the anti-swelling salt the time required at a given concentration of alkali is increased, for example at 1 N and 20° C. to 24 to 36 hours, with an optimum of 30 hours. Suitable salts of other alkali metals, lithium and potassium, and even ammonium salts under suitable conditions, can be used as the anti-swelling salts.

If the normality of the sodium hydroxide is increased the time required is reduced, the limit being believed to be set by the permeability and state of comminution of the collagen; excessively concentrated alkali overtreats and damages the outer part of a piece of collagen while not permeating sufficiently to treat the interior adequately.

After treatment the collagen is neutralised by soaking in acid, and washed. Its extractability may then be determined. A batch of low extractability can of course be re-treated; one of over-high extractability is preferably discarded.

While the extractability, which is determined by the treatment given to the raw collagen, cannot readily be changed once the collagen has been milled in preparation for making the dough, adjustment of the solids content by addition of water to give the desired viscosity in the eventual dough is possible. Process variations and variations in the starting material can therefore be allowed for once a suitable figure for the extractability has been found by simple experiment.

We do not limit the application of the invention by the following theory but we believe the viscosity of the dough to be broadly a function of the concentration of collagen fibres in the dough and accordingly a heavily alkali-treated collagen, with few fibres, can give a high enough viscosity if the dough is of high total solids content, while a lightly alkali-treated collagen can give a low enough viscosity if the dough is of low total solids content. In each case the casing produced is believed to have about the same number of fibres in a given area and is of the desired properties. Too many fibres are believed to give a tough casing, liable to splits and too few a weak one, liable to bubbling.

The solids content is readily determined by analysis or for example by comparison of the weight of a given air-free volume sample with that of the same volume of water. Tables giving the solids content for a given weight ratio can be drawn up from a knowledge of the densities of collagen and water.

In the preparation of the dough acid swelling is preferred. When it is used the final pH of the dough is preferably 2.8 to 3.5, more preferably 2.9 to 3.1. Organic hydroxy acids are examples of suitable swelling agents, examples being citric acid and lactic acid of which the latter is preferred. Where alkaline swelling is used the final pH is preferably 11.5 to 12.2, more preferably 11.8 to 12.1.

The adjustment of extractability is preceded by the usual washing, disinfection and unhairing of the hides. A suitable method for making the dough is described in detail by way of example as follows:

Fresh green hair-on hides obtained from steers approximately 18 months old, are trimmed and cleaned of ears and tail, and each is cut down the back into two halves.

STAGE 1

The half hides are placed in a drum washer and given the following treatment (percentages are based on the weight of green hide):

(a) wash in water, until wash water is virtually clean (say half an hour)
(b) wash for 20 minutes in 1% L.Q. 12 (detergent) and 150% water
(c) wash for 15 minutes with water
(d) treat for 2 hours in a solution consisting of 150% water and 2 litres of "Chloros" (sodium hypochlorite disinfectant) per whole hide
(e) wash for 30 minutes with water
(f) remove hair by clipping
(g) leave standing in water overnight.

The hides are then defleshed and split using standard tannery equipment, the grain layers being rejected and the flesh layers placed in chill until required.

STAGE 2

When required the splits are cut up for example into approximately 6 inch (14 cm.) squares and are placed in a steeping vessel containing 400% of saturated sodium sulphate solution at 20° C.±2° C. The steeping vessel preferably contains a horizontal reciprocating blade for agitation and is jacketed.

After four hours the saturated sodium sulphate solution is replaced by a similar volume of saturated sodium sulphate at the same temperature containing 1–N caustic soda. Flake caustic soda is periodically added to maintain the normality at 1. After approximately 22 hours the caustic solution is removed and the hides are given three quick washes with clean water totalling half an hour.

After the washes the hides are acid washed at pH 4 with hydrochloric acid in a solution of approximately 800% water and 20% sodium chloride. When the centre of the splits is neutral, usually in 1½ to 2 days, the acid solution is run off and the hides are continuously washed with water for about 24 hours until the effluent is virtually clear of salts.

STAGE 3

The treated washed hide is minced with water by passing once through a mill on a coarse setting and once through a mincer with a plate containing 1.5 mm. holes. It is then passed three times through a colloid mill and stored in a chill while its solids content and extractability are being determined. During the mincing stage the solids content of the collagen drops from about 20% to between 7 and 10%. Care is taken to ensure that the collagen temperature does not go above 30° C., the preferred upper limit. A temperature of 40° C. must never be exceeded.

STAGE 4

When the milled collagen is required it is remilled six times with sufficient water and glycerol to bring its solids content and viscosity down to a suitable figure and its glycerol content to 5 to 10% on a dry weight basis. (The glycerol is optional at this stage. If omitted earlier it is preferably present in the wash water used after casing has been made from the dough.)

After milling the collagen is fed by means of a lobe pump through a mixer having a disc with studs on both sides rotating in a stator also provided with studs (an Oakes Mixer). Immediately prior to the lobe pump the correct quantity of lactic acid is injected into the collagen stream by a metering pump, to adjust the pH of the swollen collagen to 3.05±0.05. On leaving the mixing head the pH of the acidified swollen collagen is periodically checked, and by varying the input of acid an almost constant pH collagen is maintained. The acid-swollen collagen, now a dough, is further mixed and deaerated in a Z-blade vacuum mixer for 20 minutes at a mercury pressure of less than 2 inches (5 cm.). After deaeration the dough is removed and allowed to stand for at least 24 hours before being extruded or otherwise shaped by any suitable means. It is stored in chill if it is not likely to be used within 2 days.

In the commercial application of the invention the formula given earlier can be used for the preparation of a prediction chart for use, such as that of the accompanying figure. For any given extractability the useful range and best value for solids content can be determined by noting which solids content lines fall within the band of useful apparent viscosities.

Where the given chart and equation are not applicable, for example if hides from animals other than ordinary cattle are to be used, a chart can readily be established empirically. Samples of milled collagen of different extractabilities are taken, made into doughs, and divided into aliquots for making up into batches of different solids contents. The apparent viscosity of the doughs is also measured and each batch is extruded and the resulting casing stuffed and assessed by cooking and tasting. From the cooking results it will be clear that the best casing is obtained in a particular area on the chart that is drawn up.

The acceptable region is then explored by making up doughs from a milled collagen of suitable extractability, between the widely separated values chosen initially. The cooking results will indicate the most acceptable material.

The invention is illustrated by the following examples.

EXAMPLE 1

A green hide from an 18-month steer was trimmed, halved, washed and unhaired as in Stage 1 of the procedure, already described. It was then split and the flesh layers, weighing 12 kg. at 20% solids were cut into 6-inch (14 cm.) squares and steeped at 20° C. for four hours in 50 litres of saturated sodium sulphate solution. The solution was then replaced by a similar solution containing additionally caustic soda adjusted to 1—$N$, which was allowed to act for 22 horus with periodic addition of flake caustic soda to maintain the normality of the solution. After the treatment the splits were washed three times for 10 minutes in water and then soaked for 1½ days in 100 litres of hydrochloric acid solution, pH 4, containing 2.4 kg. common salt. After this time the splits were neutral throughout. They were then washed, minced and milled as in the procedure already described, the temperature being maintained at approximately 20° C. The resulting milled collagen was found to have a solids content of 8% and an extractability of 10 measured by the detailed method described hereinbefore, and was remilled six times after addition of 15.2 litres of 0.75% v./v. aqueous glycerol to give a material of 5.3% solids content (the best value indicated by the chart of FIG. 1) and 6% glycerol content.

The milled collagen was then converted to an acid-swollen dough of pH 3.05, apparent viscosity 60 poise, by passing it through an Oakes Mixer, 0.9 kg. of lactic acid being fed evenly into it by a metering pump as it passed to the mixer. The dough was finally deaerated into a Z-blade mixer under a reduced pressure of approximately 2.5 cm. of mercury and allowed to stand in chill for 36 hours.

The dough was then extruded through a contra-rotating head extruder into a setting bath of saturated common salt solution, as described in our co-pending United Kingdom application No. 32,451/67, and was dried, washed and dried again to give a casing of 18 mm. diameter and thickness 0.025 mm. After conditioning for a week at 20° C. at 80% relative humidity the casing was stuffed and twist-linked. On frying it showed neither splits nor bubbling, and was firm but not tough on eating.

EXAMPLE 2

A green hide from an 18-month steer was trimmed, halved and washed in the way already described. It was then split and the flesh layers, weighing 14 kg. at 17% solids were cut into 6-inch (14 cm.) squares and steeped at 20° C. for 4 hours in 50 litres of saturated sodium chloride solution. The solution was then replaced by a similar solution containing additionally caustic soda adjusted to 2—$N$, which was allowed to act for 5 hours with periodic addition of flake caustic soda to maintain the normality of the solution. After the treatment the splits were washed three times for 10 minutes in water and then soaked for 1½ days in 100 litres of hydrochloric acid solution, pH 4, containing 2.4 kg. common salt. After this time the splits were neutral throughout. They were then washed, minced and milled as already described, the temperature being maintained at approximately 20° C. The resulting milled collagen was found to have a solids content of 15% and an extractability of 14.4 measured by the detailed method described hereinbefore, and was remilled six times after addition of 27.3 litres of 0.42% v./v. aqueous glycerol to give a material of 5.5% solids content and 6% glycerol content (on solids basis). Extrusion, stuffing and cooking gave good results as before.

What is claimed is:

1. A method for the preparation of an extrudable collagen dough comprising
    (i) soaking collagen at a temperature of about 20° C. to about 30° C. and at a pH above 13 in an aqueous solution of an alkali metal sulfate or chloride, and sodium hydroxide, without substantial swelling of said collagen, said sulfate or chloride being present in a proportion corresponding to over 90% saturation, and said sodium hydroxide being present in a proportion sufficient to provide a pH above 13,
    (ii) determining the extractability of said soaked collagen,
    (iii) terminating said soaking when said extractability reaches a value of between about 8% and about 16%, dry weight basis,
    (iv) adjusting the solids content of said collagen to about 4.5% to about 6.5 dry weight basis in accordance with said extractability, to provide an apparent viscosity of about 45 to about 80 poises, and
    (v) treating said collagen with an organic hydroxy acid, thereby forming a swollen dough, the amount of said acid being sufficient to provide a pH of 2.8 to 3.5.

2. A method in accordance with claim 1 wherein said collagen is from green hides.

3. A method in accordance with claim 1 wherein said collagen is from mechanically unhaired hides.

4. A method in accordance with claim 1 wherein said acid is selected from the group consisting of lactic acid and citric acid.

5. A method in accordance with claim 1 which comprises the additional steps of extruding said dough through a contra-rotating head extruder into a setting bath of saturated common salt solution, thereby forming a casing, and washing and drying said casing.

References Cited

UNITED STATES PATENTS

| | | | |
|---|---|---|---|
| 3,297,459 | 1/1967 | Veis et al. | 264—202 |
| 3,374,103 | 3/1968 | Barkin | 264—202 |
| 3,433,864 | 3/1969 | Highberger et al. | 264—202 |
| 2,934,447 | 4/1960 | Highberger et al. | 106—155 |

FOREIGN PATENTS

| | | | |
|---|---|---|---|
| 780,617 | 8/1957 | Great Britain | 264—202 |

ROBERT F. WHITE, Primary Examiner

J. R. THURLOW, Assistant Examiner

U.S. Cl. X.R.

99—176; 106—155, 161; 264—202, 209